United States Patent
O'Neil et al.

(10) Patent No.: US 12,341,794 B2
(45) Date of Patent: Jun. 24, 2025

(54) AUTOMATED ESTIMATION OF NETWORK SECURITY POLICY RISK

(71) Applicant: Zscaler, Inc., San Jose, CA (US)

(72) Inventors: John O'Neil, Watertown, MA (US); Michael J. Melson, Arlington, VA (US)

(73) Assignee: Zscaler, Inc., San Jose, CA (US)

( * ) Notice: Subject to any disclaimer, the term of this patent is extended or adjusted under 35 U.S.C. 154(b) by 262 days.

(21) Appl. No.: 17/979,439

(22) Filed: Nov. 2, 2022

(65) Prior Publication Data

US 2023/0056212 A1 Feb. 23, 2023

Related U.S. Application Data

(63) Continuation of application No. 16/898,760, filed on Jun. 11, 2020, now Pat. No. 11,509,673.

(Continued)

(51) Int. Cl.
*H04L 9/40* (2022.01)
*H04L 41/14* (2022.01)
(Continued)

(52) U.S. Cl.
CPC ........ *H04L 63/1425* (2013.01); *H04L 41/142* (2013.01); *H04L 41/145* (2013.01); *H04L 61/5007* (2022.05)

(58) Field of Classification Search
CPC . H04L 63/1433; H04L 63/20; H04L 63/1441; H04L 63/102; H04L 63/08; H04L 63/10; H04L 2209/38; H04L 63/1416; H04L 2209/46; H04L 2209/805; H04L 41/046; H04L 41/0893; H04L 41/12; H04L 41/145; H04L 41/16; H04L 63/0853;
(Continued)

(56) References Cited

U.S. PATENT DOCUMENTS

| | | | |
|---|---|---|---|
| 6,914,905 B1 * | 7/2005 | Yip | H04L 45/00 370/395.53 |
| 7,664,879 B2 * | 2/2010 | Chan | H04L 67/14 711/113 |

(Continued)

FOREIGN PATENT DOCUMENTS

WO 2018152303 A1 8/2018

*Primary Examiner* — Sharif E Ullah
(74) *Attorney, Agent, or Firm* — Baratta Law PLLC; Lawrence A. Baratta, Jr.; Ryan Odessa

(57) ABSTRACT

A computer system automatically tests a network communication model by predicting whether particular traffic (whether actual or simulated) should be allowed on the network, and then estimating the accuracy of the network communication model based on the prediction. Such an estimate may be generated even before the model has been applied to traffic on the network. For example, steps can include observing positive data associated with a network; generating a network communication model based on the positive data; generating negative data based on the network communication model; calculating a precision of the network communication model based on the network communication model and the negative data; and calculating an accuracy of the network communication model based on one or more of the precision of the network communication model, or the network communication model and the positive data.

17 Claims, 2 Drawing Sheets

Related U.S. Application Data

(60) Provisional application No. 62/860,094, filed on Jun. 11, 2019.

(51) Int. Cl.
  *H04L 41/142* (2022.01)
  *H04L 61/5007* (2022.01)

(58) Field of Classification Search
  CPC . H04L 63/104; H04L 63/1425; H04L 63/205; H04L 63/0272; H04L 61/1511; H04L 63/0236; H04L 67/563; G06F 2221/2101; G06F 21/552; G06F 21/554; G06F 21/56; G06F 21/566; G06F 2221/034; G06F 21/57; G06F 21/577; G06F 21/602; G06F 21/6209; G06F 21/6218; G06F 8/61; H04W 12/06; H04W 12/08; H04W 12/0027; H04W 12/00505; H04W 12/0609
  USPC .......... 726/22, 2, 21, 36; 713/150, 163, 181; 380/255, 264, 276
  See application file for complete search history.

(56) References Cited

U.S. PATENT DOCUMENTS

| | | | | |
|---|---|---|---|---|
| 7,725,934 | B2 * | 5/2010 | Kumar | H04L 63/0245 713/188 |
| 7,962,582 | B2 * | 6/2011 | Potti | H04L 63/102 370/400 |
| 8,010,085 | B2 * | 8/2011 | Apte | G06F 21/577 709/227 |
| 8,464,335 | B1 * | 6/2013 | Sinha | G06F 21/51 713/153 |
| 8,656,154 | B1 * | 2/2014 | Kailash | H04L 63/0807 713/168 |
| 8,868,757 | B1 * | 10/2014 | Liu | H04L 67/563 709/227 |
| 8,869,259 | B1 * | 10/2014 | Udupa | H04L 63/20 726/10 |
| 8,869,262 | B2 * | 10/2014 | Mullick | H04L 63/0876 709/227 |
| 8,955,091 | B2 * | 2/2015 | Kailash | H04L 63/1425 726/11 |
| 9,065,800 | B2 * | 6/2015 | Devarajan | G06F 21/56 |
| 9,100,424 | B1 * | 8/2015 | Thomas | H04L 69/16 |
| 9,124,586 | B2 * | 9/2015 | Randriamasy | H04L 67/101 |
| 9,344,393 | B2 * | 5/2016 | Boynton | H04L 63/0428 |
| 9,531,758 | B2 * | 12/2016 | Devarajan | H04L 63/20 |
| 9,654,507 | B2 * | 5/2017 | Gangadharappa | H04L 63/20 |
| 9,712,486 | B2 * | 7/2017 | Johnson | H04L 41/08 |
| 9,882,767 | B1 * | 1/2018 | Foxhoven | H04L 61/4552 |
| 9,935,955 | B2 * | 4/2018 | Desai | H04L 67/02 |
| 10,044,719 | B2 * | 8/2018 | Desai | H04L 63/20 |
| 10,091,169 | B2 * | 10/2018 | Cohen | H04L 67/10 |
| 10,142,362 | B2 * | 11/2018 | Weith | H04L 63/20 |
| 10,154,067 | B2 * | 12/2018 | Smith | H04L 63/20 |
| 10,313,397 | B2 * | 6/2019 | Komu | H04L 63/20 |
| 10,333,988 | B2 * | 6/2019 | Porras | H04L 63/107 |
| 10,439,985 | B2 * | 10/2019 | O'Neil | H04L 47/2441 |
| 10,637,724 | B2 * | 4/2020 | Johnson | H04W 12/062 |
| 2002/0091921 | A1 * | 7/2002 | Kunzinger | H04L 63/0471 713/153 |
| 2003/0028616 | A1 * | 2/2003 | Aoki | H04L 67/1001 709/217 |
| 2005/0088977 | A1 * | 4/2005 | Roch | H04L 47/31 370/254 |
| 2012/0255036 | A1 * | 10/2012 | Kidder | H04L 63/08 726/29 |
| 2014/0026206 | A1 * | 1/2014 | Pazhyannur | H04W 12/06 726/12 |
| 2014/0259093 | A1 * | 9/2014 | Narayanaswamy | H04L 47/20 726/1 |
| 2017/0054594 | A1 * | 2/2017 | Decenzo | H04L 69/18 |
| 2017/0244737 | A1 * | 8/2017 | Kuperman | G06N 3/084 |
| 2018/0309795 | A1 * | 10/2018 | Ithal | H04L 63/029 |
| 2018/0316723 | A1 * | 11/2018 | Murgia | H04L 63/0428 |
| 2018/0359323 | A1 * | 12/2018 | Madden | H04L 12/4633 |
| 2019/0349283 | A1 * | 11/2019 | O'Neil | H04L 43/0876 |
| 2020/0021618 | A1 * | 1/2020 | Smith | H04L 63/20 |
| 2020/0112487 | A1 * | 4/2020 | Inamdar | H04L 43/08 |
| 2020/0322357 | A1 * | 10/2020 | Bryan | H04L 63/1408 |

* cited by examiner

AUTOMATED ESTIMATION OF NETWORK SECURITY POLICY RISK

CROSS-REFERENCE TO RELATED APPLICATIONS

This application is a continuation of U.S. patent application Ser. No. 16/898,760, filed Jun. 11, 2020, the contents of which are incorporated by reference herein, and which claimed priority to U.S. Provisional Application No. 62/860,094, filed Jun. 11, 2019, the contents of which are incorporated by reference herein.

This application is related to the following patent applications, both of which are incorporated by reference herein:
- Application Ser. No. 15/883,534, filed on Jan. 30, 2018, entitled, "Network Application Security Policy Enforcement," now U.S. Pat. No. 10,154,067, issued on Dec. 11, 2018 (hereinafter "the Policy Enforcement Patent"); and
- U.S. patent application Ser. No. 15/899,453, filed on Feb. 20, 2018 entitled, "Network Application Security Policy Generation," now U.S. Pat. No. 10,439,985, issued on Oct. 8, 2019 (hereinafter "the Policy Generation Patent").

BACKGROUND

A variety of techniques exist for generating and enforcing network security policies by analyzing existing network traffic, whether manually or automatically. Once such policies exist, however, the security risk that will still exist when such policies are enforced may still not be known. Such uncertainty about the risk that remains even when network security policies are enforced is undesirable.

SUMMARY

A computer system automatically tests a network communication model by predicting whether particular traffic (whether actual or simulated) should be allowed on the network, and then estimating the accuracy of the network communication model based on the prediction. Such an estimate may be generated even before the model has been applied to traffic on the network. For example, the model may be generated based on a first set of network traffic. The accuracy of the model may then be estimated based on a second set of network traffic, such as a simulated set of network traffic. This allows the accuracy of the model to be estimated without first waiting to apply the model to actual network traffic, thereby reducing the risk associated with applying the model before its accuracy is known.

Other features and advantages of various aspects and embodiments of the present invention will become apparent from the following description and from the claims.

DETAILED DESCRIPTION

Figure 1:
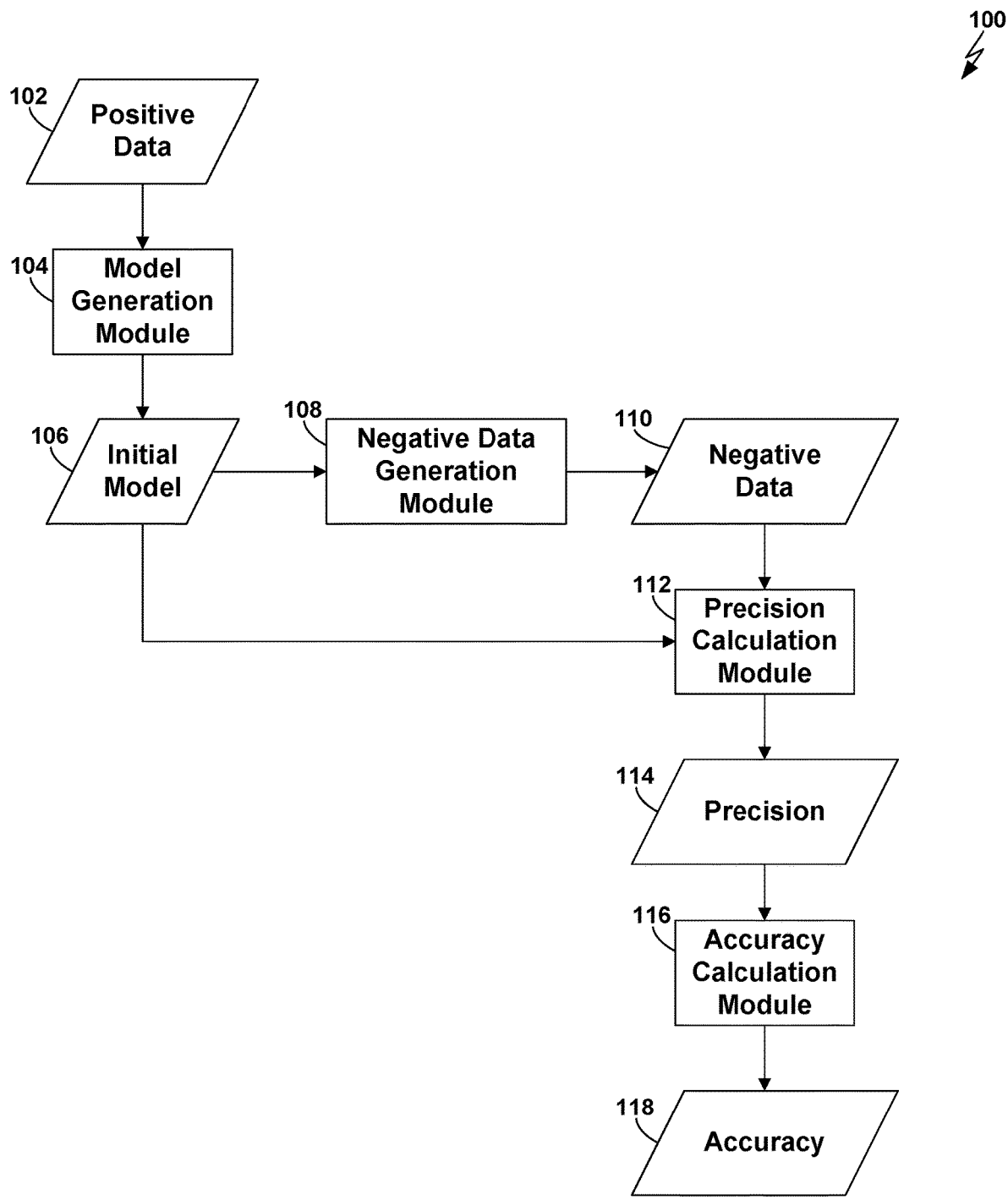
FIG. 1 is a dataflow diagram of a system for generating negative data to calculate the accuracy of a network communication model according to one embodiment of the present invention.

A computer system automatically tests a network communication model by predicting whether particular traffic (whether actual or simulated) should be allowed on the network, and then estimating the accuracy of the network communication model based on the prediction. Such an estimate may be generated even before the model has been applied to traffic on the network. For example, the model may be generated based on a first set of network traffic. The accuracy of the model may then be estimated based on a second, simulated (i.e., not actual), set of network traffic. This allows the accuracy of the model to be estimated without first waiting to apply the model to actual network traffic, thereby reducing the risk associated with applying the model before its accuracy is known.

As described in the Policy Enforcement Patent and the Policy Generation Patent, information may be collected automatically about applications executing on a network, and network security policies may be generated automatically based on the collected information. Such policies may then be enforced at the application and host level within the network. As will be described in more detail below, embodiments of the present invention may automatically estimate the accuracy of such policies, even before they have been applied.

For example, assume that a set of network security policies has been generated for a particular network (or network segment) in any of a variety of ways, such as by using the techniques disclosed in the Policy Generation Patent, and that it is desired to begin to enforce such policies on the network. This raises two questions:

(1) How much of the current traffic on the network would be allowed and/or blocked by one or more of the policies?

(2) Based on a future state of the network, how much network traffic at that point would be allowed and/or blocked by one or more of the policies?

The answers to these questions may be calculated straightforwardly by first applying the policies to the network and then measuring the actual performance of the policies once they have been applied to traffic on the network. Waiting until the policies have been applied before identifying the accuracy of those policies, however, creates uncertainty and risk during the period when the policies are being applied but when the accuracy of the policies is unknown. It is desirable, therefore, to at least estimate the accuracy of the policies even before they have been applied. Embodiments of the present invention provide a variety of mechanisms for performing such estimation automatically before the policies have been applied to the network, and for updating the resulting estimates automatically over time as the policies are applied to the network.

Embodiments of the present invention may also perform such estimation automatically after the policies have been applied to the network, such as in addition to or instead of performing such estimate before the policies have been applied to the network. For example, the estimation may be performed before any of the policies have been applied to the network, and then performed again (e.g., repeatedly) after the policies have been applied to the network, in order to update the estimate based on observed network communications.

By way of background, and as described in more detail in the above-referenced Policy Enforcement Patent and Policy Generation Patent, a network may generate a stream of matched flows. Each matched flow includes information about a particular communication between a source application A0 on a source host H0 and a destination application A1 on a destination host H1, where the source application A0 initiated the communication. The matched flow may also contain (among other things) a timestamp that specifies the time at which the communication occurred. From this stream of matched flows, a set of nearly optimal policies may be generated automatically. Such policies are also referred to herein as a "network communication model," or simply as a "model." Such a model describes some or all of the traffic on the network very succinctly and accurately.

As will be described in more detail below, embodiments of the present invention may test such a model by predicting whether another set of network traffic (i.e., traffic other than the traffic that was used to train the model) should be allowed on the network. Embodiments of the present invention may estimate the accuracy of the model based on this prediction. The traffic that is used to estimate the accuracy of the model may be automatically generated, and may be simulated in the sense that it is represented by computer-generated data that represents features of network traffic, whether or not such traffic has actually occurred on the network.

As described above, embodiments of the present invention may estimate the "accuracy" of a network communication model. Such accuracy may be defined in any of a variety of ways. For example, a distinction may be made between "precision" and "recall," and accuracy may be defined based on a combination of precision and recall. One example of such a definition of accuracy is as follows.

Assume that both positive and negative data representing network traffic (e.g., messages and/or connections) exists, where positive data represents traffic that the network communication model should allow and where negative data represents traffic that the network communication model should not allow. Given the availability of such positive and negative data, embodiments of the present invention may automatically create an optimal network communication model which, for a particular piece of data representing network traffic, predicts as well as possible whether that data (e.g., message or connection) should be allowed. Such a process is usually referred to as "supervised learning" because the learning process has both positive and negative data as inputs.

Once such a model has been generated, it is desirable to measure how well the model predicts the data by looking for two kinds of errors in the model:

Errors where a datum is predicted by the model to be positive, when in fact the datum is negative (i.e., false positives).

Errors where a datum is predicted by the model to be negative, when in fact the datum is positive (i.e., false negatives).

The two types of errors above may be defined more formally as follows. First, two sets are defined:

"ACC" is defined as the set of all data allowed by the model. Note that the complement of this set is all of the data that is not allowed by the model, which is defined herein as "DEN."

"POS" is defined as the set of all positive data. Note that the complement of this set is all of the negative data.

"NEG" is defined as the set of all negative data.

"HITS" is defined as the number of data which are both: (1) allowed by the model, and (2) observed in the real data. In other words, HITS is the size of the intersection of ACC and POS.

"MISSES" is defined as the number of data which are both: (1) not allowed by the model, and (2) observed in the real data. In other words, HITS is the size of the intersection of DEN and POS.

"FALSE_ALARMS" is defined herein as the number of data which are both: (1) allowed by the model, and (2) not observed in the real data. In other words, FALSE_ALARMS is the size of the intersection of ACC and NEG.

Next, measurements of the two types of errors may be defined. First, techniques for defining how to measure the two types of corresponding accuracy will be described.

"Precision" is defined as the number of positive data that the model correctly predicts (i.e., HITS) divided by the size of the set of allowed data that is not observed in the real data (i.e., FALSE_ALARMS), in other words as:

$$\text{Precision} = \frac{\text{HITS}}{\text{HITS} + \text{FALSE\_ALARMS}}$$

"Recall" is defined as the number of positive data that the model correctly predicts (i.e., HITS) divided by the entire set of predicted data (e.g., HITS plus MISSES), in other words as:

$$\text{Recall} = \frac{\text{HITS}}{\text{HITS} + \text{MISSES}}$$

The definitions above are the standard definitions of the two types of errors in multi-class learning. Note that the actual error measurement for each type is 1-Precision and 1-Recall.

However, there is a problem in the case of the network communication model generated by the techniques disclosed in the Policy Enforcement Patent and the Policy Generation Patent, namely that there is no negative data. Instead, the techniques disclosed therein generate a network communication model based only on positive data. In this case, because there is no negative data, ACC is a subset of POS. (That is, the hypothetical negative data that would be within ACC if it existed does not exist.) In a case such as this, in which there is only positive data, recall can be calculated but precision cannot be calculated. It can be beneficial, however to calculate precision, because it can be a measure of how much the model over-generalizes from the observed data. The lower the value of precision, the more often the model will see data that should not be allowed by the model but allow it anyway. Without negative data, the value of precision will always be equal to one, because the model has no negative data to predict incorrectly.

Embodiments of the present invention address this problem by generating negative data, which may then be used to calculate one or more values of precision which are not equal to one, and which may therefore be used to gauge the performance of the model. As will be described in more detail below, negative data generated by embodiments of the present invention may be simulated, i.e., such data need not represent actual traffic (e.g., messages or connections) observed on the network. As a result, negative data generated by embodiments of the present invention is also referred to herein as "hypothetical data" representing "hypothetical communications." The generated negative data may, however, be generated to have properties which make it plausibly represent negative data that could be observed on the network, based on actual positive data that has been observed on the network. This ability to generate simulated negative data and then to calculate one or more values of precision based on that simulated negative data has the benefit of enabling embodiments of the present invention to calculate such values of precision, and thereby to gauge the accuracy of the model, even before the model has been put into use (e.g., because the model has been applied to enforcement of traffic on the network). As a result, embodiments of the present invention may identify inaccuracies in the model even before the model has been put into use, and such inaccuracies may be addressed even before the model has been put into use, such as by modifying the model to make it more accurate (e.g., to increase the model's recall and/or precision). This ability to gauge the model's accuracy and to improve the model even before it has been put into use, based on simulated negative data, may enable such improved models to be put into use on the network more quickly than would otherwise be possible, and thereby reduce security risks on the network more quickly than would otherwise be possible.

Figure 2:
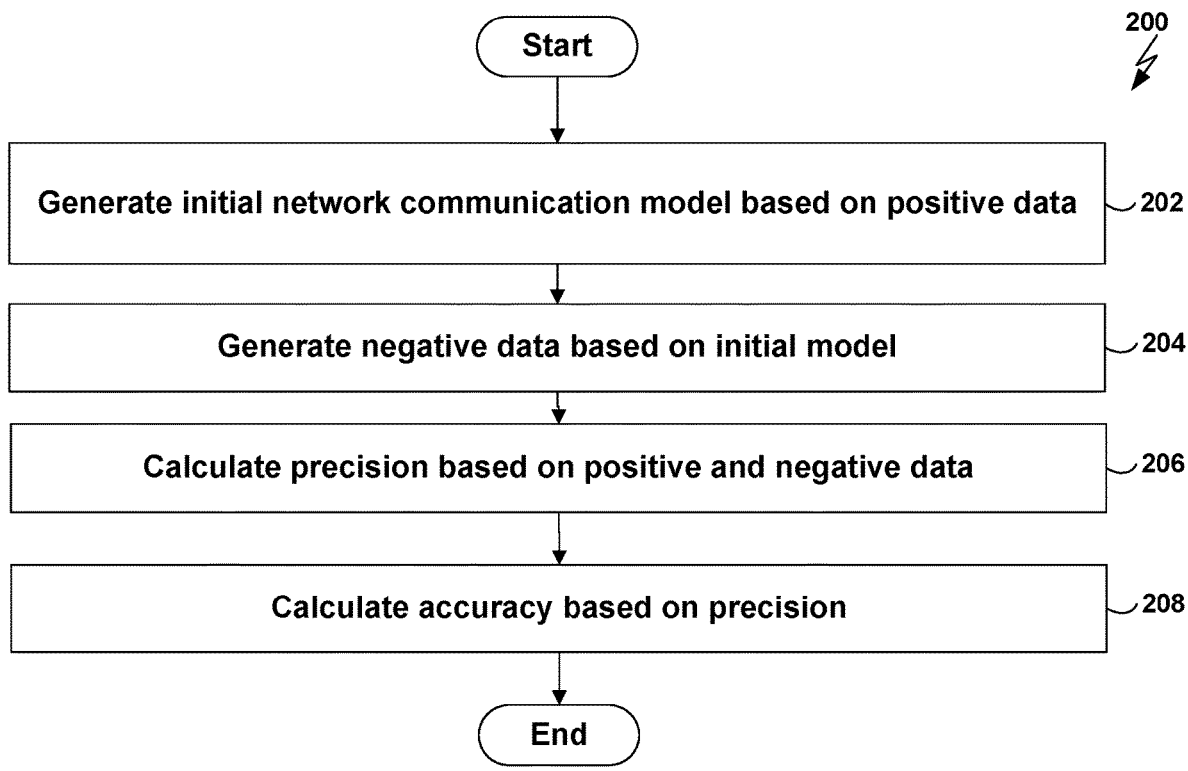
FIG. 2 is a flowchart of a method performed by the system of FIG. 1 according to one embodiment of the present invention.

Referring to FIG. 1, a dataflow diagram is shown of a system 100 for generating negative data (e.g., hypothetical communication data) to calculate the accuracy of a network communication model 106 according to one embodiment of the present invention. Referring to FIG. 2, a flowchart is shown of a method 200 performed by the system 100 according to one embodiment of the present invention.

The system 100 includes a network communication model generation module 104, which receives positive data 102 (e.g., data representing communications on a network that should be allowed on the network), and which generates an initial network communication model 106 based on that data 102 (FIG. 2, operation 202). Examples of techniques that may be used to perform such model generation are disclosed in the above-referenced Policy Generation Patent.

The system 100 also includes a negative data generation module 108, which receives the initial model 106 as input, and which generates negative data 110 as output based on the initial model 106 (FIG. 2, operation 204). As described in more detail in the Policy Generation Patent, the initial model 106 may include some or all of the positive data 102. The negative data generation module 108 may, therefore, generate the negative data 110 based, at least in part, on some or all of the positive data 102, either directly or indirectly. As described above, the negative data generation module 108 may generate the negative data 110 based on the initial model 106 before the initial model 106 has been enforced against traffic on the network. Furthermore, even if the negative data generation module 108 generates the negative data 110 after the initial model 106 has been applied to traffic on the network, the negative data generation module 108 may generate the negative data 110 without making use of any data representing traffic on the network other than the positive data 102 that was used to generate the initial model 106 itself.

More specifically, a "flow match" may be expressed as (A0, H0)→(A1, H1), where:
- $H_0$ is a first host, referred to herein as a "source host," because it initiates a network connection;
- $A_0$ is a first application, referred to herein as a "source application," which executes on the source host $H_0$ and which initiates the network connection;
- $H_1$ is a second host, referred to herein as a "destination host," because it is the destination of the connection initiated by the source host; and
- $A_1$ is a second application, referred to herein as a "destination application," which executes on the destination host $H_1$ and which is the destination of the connection initiated by the source application.

The initial network communication model 106 is learned based on flow match data representing some or all of the flow matches observed on the network. The negative data generation module 108 may generate the negative data 110 by:
- collecting all of the unique (A, H) pairs from the flow match data, whether they be on the source or destination side of the flow matches; and
- generating a plurality of new flow matches, in the negative data 110, which do not exist in the flow match data in the initial model 106, but whose source flows and destination flows exist in the flow match data in the initial model 106.

In other words, for each flow match $(A_0, H_0)\to(A_1, H_1)$ in the negative data 110:
- $(A_0, H_0)$ exists in the initial Positive Data 102, either on the source or destination side of at least one flow match;
- $(A_1, H_1)$ exists in the initial Positive Data 102, either on the source or destination side of at least one flow match; and
- $(A_0, H_0)\to(A_1, H_1)$ does not exist in the initial Positive Data 102.

As the description above implies, a flow on the source side of a flow match in the initial Positive Data 102 may occur on the source or destination side of a flow match in the negative data 110, and a flow on the destination side of a flow match in the initial model 106 may occur on the source or destination side of a flow match in the negative data 110. Alternatively, it is possible to limit the sources and destinations of constructed data to come from only the sources or destinations of positive data 102, respectively.

The flow matches in the negative data 110, therefore, do not exist in the initial model 106 (or the positive data 102), but do contain flows which exist in the initial model 106 (and the positive data 102). In other words, each side (A, H) of each flow match in the negative data 110 is a real host-application pair that was observed to communicate with some other (A, H) pair on the network, but the flow match as a whole is guaranteed by the negative data generation module 108 not to have communicated with each other over the network in the communications observed by the model generation module 104. The negative data generation module 104 may achieve this result in any of a variety of ways, some of which may involve generating at least some flow matches which do exist within the initial model 106 but then excluding them from the negative data 110 after determining that they exist in the initial model 106.

For example, the negative data generation module 108 may generate an initial set of negative data in any of a variety of ways, and then select a subset of the initial set of negative data as the final negative data 110 shown in FIG. 2. The system 100 also includes a precision calculation module 112, which receives the negative data 110 and the initial model 106 as inputs, and which calculates and outputs a precision value 114 based on the negative data 110 and the positive data in the initial model 106, such as by using the definition of precision above (FIG. 2, operation 206).

Recall that ACC was defined as the set of all data allowed by the model 106. Now that the negative data 110 have been generated, the set of allowed data ACC may include both the hits (i.e., a subset of the positive data is allowed by the model 106) and the false alarms (i.e., any subset of the negative data 110 that the model 106 actually allows). The false alarms may, for example, be a proper subset of the negative data 106, i.e., the false alarms may include some elements (e.g., communications and/or connections) of the negative data 110 and not others. To identify the false alarms, embodiments of the present invention may, for example, apply the model 106 to the negative data 110 and then identify any communications, connections, and/or matches within the negative data 110 that are allowed by the model 106; these are the false alarms. The precision calculation module 112 may use such false alarms in its calculation of precision P, such as by using the formula above. Similarly, embodiments of the present invention may use such false alarms in their calculation of recall R and accuracy F, such as by using the formula above for recall R and below for accuracy F.

The system includes an accuracy calculation module 116, which receives the precision value 114 as input and calculates an accuracy value 118 of the initial model 106 based, at least in part, on the precision value 114 (FIG. 2, operation 208). Although not shown in FIG. 2, the accuracy calculation module 116 may also receive the positive data 102 and/or initial model 106 as inputs, and may use such inputs as well to calculate the accuracy value 116. For example, the accuracy calculation module 116 may calculate a value of recall using the definition above, and then calculate the accuracy value based solely on the recall value, or based on a combination of the precision value 114 and the recall value. One example of a way to perform the latter is to use the F measure, which is the harmonic mean of the precision 114 and recall:

$$F = \frac{2 \times P \times R}{P + R}$$

Examples of techniques for estimating the accuracy of the model 106 will now be described in more detail. In one embodiment of the present invention, training and testing of the model 106 is performed as follows. The match flow data in the model 106 are segmented into a sequence of bins corresponding to successive time periods Ti. For every time period Ti, a model Mi is created, such as by using techniques disclosed in the Policy Generation Patent, for the cumulative data up from T0 to Ti, inclusive. Each such resulting model is "nearly optimal" in the sense that it is unlikely that it is possible to find a more accurate model on the training data.

Without loss of generality, embodiments of the present invention may create a "time limit" of N time periods for training, such that the model Mi is trained on the data from time Ti−N to time Ti, where N<i.

For any of the models Mi, the model may be tested on data from time period Tj, where j>i. (There is little if any value in testing a model on the data it was trained on, so instead data from later times are used.) For each test, the model Mi is used to predict whether the data should be accepted, and then the accuracy of the model on that data is calculated using the techniques disclosed above.

The estimated accuracy of each such model Mi may be tracked over time, such as in the following manner. For every model Mi, the model may be tested and its accuracy may be estimated on every future time segment's data Tj, where j>i. Alternatively, the model may be tested only for a limited number P of future time periods Tj, where i<j<=i+P. When model Mi was tested on the data in Tj, we call this accuracy Eij.

From this, embodiments of the present invention may track the accuracy Eij of the model Mi on future data. Since there is noise (sampling error and other random events) in the model, the results from a single time period or a single model does not provide much valuable information about the overall accuracy of the model 106.

However, if an average is calculated over the futures of all the extant models, a more accurate prediction of the accuracy of a new model may be obtained, both on data in the immediate future as well as data further in the future. For each i from 0 to the present, Ei(i+1) may be used to statistically estimate the most likely accuracy for all the models for the next time period immediately after their training. Similarly, this may be repeated for two time periods in the future, and for three time periods, and more generally for any plurality of time periods in the future. These estimations may be charted to see the overall accuracy time decay for models created for a particular network.

The techniques disclosed herein may be extended to host segments (i.e., segments of the network consisting of subsets of the hosts in the network) and application collections. For example, the techniques disclosed herein may be applied to a subset of the model 106, where that subset includes only the policies that apply to a subset of the hosts or applications in the network. For example, a host segment might include only a small number of hosts, and the policies (in the model 106 that affect those hosts may be a relatively small subset of all of the policies in the model 106. As another example, the techniques disclosed herein may be applied to a subset of the positive data 102 for which at least one host in a host segment is mentioned in a flow match.

The model test and accuracy tracking techniques disclosed herein may be applied not only to the model 106 and data 102 and 110 as a whole, but also to subsets of the data 102 and 100 and to subsets of the model 106, where the subsets of both are defined with respect to the same host segment. Similarly, embodiments of the present invention may use that host segment accuracy data to create a model for future model accuracy with respect to that host segment only. Note that this is also true, even if the host segment only contains a single host.

Similarly, embodiments of the present invention may create accuracy predictions in exactly the same way if the model and data subsets are defined with respect to application collections, instead of host segments.

As described above, embodiments of the present invention may measure the accuracy of a policy within the model 106 with respect to a data set representing network communications. If the model 106 includes a policy that has been applied to network communications, then embodiments of the present invention may measure the accuracy of that policy against the data set. The total accuracy of the model 106 typically will decrease over time for a set of policies when applied to data representing network communications that the set of policies does not account for. Embodiments of the present invention may, however, automatically generate modifications to the policies in the model 106 to account for that newer data without decreasing the policies' accuracy when applied to older data. Embodiments of the present invention may, for example, either automatically apply such modifications to the policies in the model 106 or suggest such modifications to a user by providing output representing the modifications to the user, receiving input from the user indicating whether the user approves of the suggested modifications, and then applying such modifications to the policies only if, and in response to, determining that the user's input indicates that the user approves of the suggested modifications.

One kind of modification to a policy in the model 106 that embodiments of the present invention may suggest or generate is a modification to one or more of the host segments and/or one or more of the application collections specified by the policy. For example, assume that the model 106 includes the following policy:

LocalAgentCollection: A
LocalAppCollection: B
RemoteAgentCollection: A
RemoteAppCollection: C In other words, according to this policy: within the host segment A, the applications in collection B are allowed to communicate with applications in collection C. Now further assume that, in the time since this policy was created, the network includes several new hosts (outside of host segment A) in which applications in collection B are communicating with applications in collection C. One way to modify the model 106 to account for this change in network traffic would be to add a new policy that reflects the new network traffic between applications in collection B and applications in collection C. If, however, there is a larger pattern of similarity between the hosts in segment A and the new hosts, then it may be desirable to modify segment A to include the new hosts, because doing so would be easier, more accurate, and leads to a more succinct set of policies in the model 106 than adding a new policy.

Embodiments of the present invention may add hosts to, or delete hosts from, an existing host segment by, for example, applying any of the techniques disclosed herein to identify a new set of host segments based on current data representing the network, comparing the new set of host segments to existing host segments, and identifying any new sets of host segments which have a substantial overlap with an existing host segment. Embodiments of the present invention may define substantial overlap in any of a variety of ways. For example, the "overlap" of the two segments may be defined as the number of data points (e.g., hosts) shared by the two segments divided by the number of data points that are only in a single one of the two segments (e.g., the sum of the number of data points that are only in the first of the two segments and the number of data points that are only in the second of the two segments). "Substantial overlap" may be defined as overall that satisfies some substantially criterion, such as exceeding some threshold value. If a new segment is determined to have substantial overlap with an existing segment, then embodiments of the present invention may suggest that the new segment be added to the existing segment, or automatically add the new segment to the existing segment to form a modified existing segment.

Any of the techniques described herein for modifying host segments may be applied to modify application collections.

Alternatively, consider a situation in which an existing segment changes its behavior after the model 106 is generated. For example, hosts in the existing segment may begin to communicate with hosts that are not covered by the existing policies within the model 106 that govern the existing segment. In such a case, embodiments of the present invention may add, to the model 106, a new policy that covers the new behavior of the existing segment. More specifically, after the model 106 has been generated, embodiments of the present invention may: (1) collect and store data representing communications of an existing segment over the network; (2) determine whether any of those communications is not covered by an existing policy; (3) identify a host segment that contains hosts that are parties to those communications; and (4) add a new policy which specifies the identified host segment and that covers those communications. These steps may be performed using any of the techniques disclosed herein for generating policies in the model 106.

Although certain examples are disclosed herein as being applied to automatically-generated policies, this is merely an example and does not constitute a limitation of the present invention. Embodiments of the present invention may also be applied to user-generated policies, in order to perform functions such as estimating the future accuracy of user-generated policies. Given this information, embodiments of the present invention may predict how accuracy has decreased or will decrease for a particular subset of a network over time. For the most drastic reductions in accuracy, embodiments of the present invention may remind the user to update those policies or to look at new automatically generated policies. This also depends on the user's tolerance for risk, which can of course be inferred from the user's behavior (or be explicitly set by the user).

One embodiment of the present invention is directed to a method performed by at least one computer processor executing computer program instructions stored in at least one non-transitory computer-readable medium. The method includes: (A) for each of a plurality of observed communications over a network between applications executing on a plurality of computer systems (e.g., hosts), collecting and storing observed communications data representing the plurality of observed communications. Such collecting and storing may be performed in any of the ways disclosed herein, the observed communications data may include any of the data disclosed herein.

The method further includes: (B) generating a network communication model based on the observed communications data. The network communication model may be generated in any of the ways disclosed herein.

The method further includes: (C) generating, based on the observed communications data, hypothetical communications data representing a plurality of hypothetical communications that is distinct from the plurality of observed communications. The hypothetical communications data may be generated in any of the ways disclosed herein, such as by generated hypothetical matches that are based on the match data 118 but which do not actually exist within the match data.

The method further includes: (D) identifying allowed data representing a plurality of allowed network communications, including at least some of the plurality of observed communications and at least some of the plurality of hypothetical communications, that are allowed by the network communication model. The allowed data may, for example, include both data within the observed communications data (referred to herein as "hits") and data within the hypothetical communications data (data referred to herein as "misses").

The method further includes: (E) identifying positive data representing a plurality of network communications that should be allowed by the network communication model. The positive data may for example, be the observed communications data, or be a subset of the observed communications data.

The method further includes: (F) calculating an accuracy of the network communication model based on the allowed data and the positive data.

The plurality of observed communications may, for example, not include any of the plurality of hypothetical communications.

Collecting and storing the observed communications data may include collecting and storing, for each of the plurality of observed communications: data representing a source application of the observed communication; data representing a destination application of the observed communication; data representing a local Internet Protocol (IP) address of the observed communication; and data representing a remote IP address of the observed communication.

The method may further include, before (B): (G) generating observed flow data based on the observed communications data, wherein the observed flow data includes a plurality of observed flow objects, wherein each of the plurality of observed flow objects contains data representing observed communications involving a single corresponding application. The method may further include, after (G) and before (B): (H) producing observed match data containing a plurality of observed match objects, wherein each of the observed match objects represents a pair of observed flow objects, in the plurality of observed flow objects, representing an observed flow at a source end of a network communication and an observed flow at a destination end of the network communication; wherein generating the network communication model comprises generating the network communication model based on the observed match data, the network communication model comprising a plurality of rules, each of which comprises at least one feature-value pair representing one of the plurality of observed communications and a corresponding probability of occurrence of the observed network communication. Generating the hypothetical communications data may include generating negative match data containing a plurality of negative match objects, wherein each of the negative match objects represents: (1) a first corresponding one of the observed flow objects in the observed match data, and (2) a second corresponding one of the observed flow objects in the observed match data, wherein none of the plurality of observed match objects includes both the first corresponding one of the observed flow objects and the second corresponding one of the observed flow objects.

In the method, (F) may include dividing: (1) a size of an intersection of the allowed data and the positive data by (2) the size of the intersection of the allowed data and the positive data plus a size of a subset of the positive data which are not allowed by the network communication model.

In the method, (F) may include: (F) (1) calculating a precision value P based on the allowed data and the positive data; (F) (2) calculating a recall value R based on the allowed data and the positive data; and (F) (3) calculating the accuracy F based on the precision value and the recall value. In the method, (F) (3) may include calculating F as $(2 \times P \times R)/(P+R)$. In the method, (F) (1) may include dividing: (1) a size of an intersection of the allowed data and the positive data by (2) the size of the intersection of the allowed data and the positive data plus a size of a subset of the hypothetical data which are allowed by the network communication model. In the method, (F) (2) may include dividing: (1) a size of an intersection of the allowed data and the positive data by (2) the size of the intersection of the allowed data and the positive data plus a size of a subset of the positive data which are not allowed by the network communication model.

Calculating the accuracy may include calculating the accuracy before applying the network communication model to any communications on the network.

Identifying the positive data may include receiving input indicating that the plurality of network communications should be allowed by the network communication model and storing data representing the input indicating that the plurality of network communications should be allowed by the network communication model.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically collect information about communications between networked applications. Such collection can only be performed by computer systems and not by humans. Furthermore, embodiments of the present invention can generate a network communication model by collecting and processing very large volumes of data, such as billions of matches, which would be impossible for a human to perform. For at least these reasons, embodiments of the present invention are inherently directed to computer-implemented systems and methods. Furthermore, embodiments of the present invention are directed to a problem—namely, improving security of networked communications between computer applications—which is inherently rooted in computer and Internet technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A non-transitory computer-readable medium comprising instructions that, when executed, cause one or more processors to perform steps of:
   collecting and storing positive data associated with real observed communications over a network;
   generating a network communication model based on the positive data;
   generating negative data based on the network communication model, the negative data representing traffic that the network communication model should not allow, wherein the negative data is generated by collecting all unique pairs from the observed positive data, and generating a plurality of new unique pairs which do not exist in the network communication model, and wherein a unique pair represents a connection between a source host and application and a destination host and application;
   calculating a precision of the network communication model based on the network communication model and the negative data; and
   calculating an accuracy of the network communication model based on one or more of the precision of the network communication model, or the network communication model and the positive data.

2. The non-transitory computer-readable medium of claim 1, wherein the negative data is generated to represent negative data that could be observed on the network.

3. The non-transitory computer-readable medium of claim 1, wherein the negative data is generated based on all of the received positive data, or a portion of the received positive data.

4. The non-transitory computer-readable medium of claim 1, wherein the network communication model is generated based on positive flow match data representing some or all of observed communications data observed on the network, and wherein observed communications data includes, for each of the plurality of observed communications: data representing a source application of the observed communication, data representing a destination application of the observed communication, data representing a local Internet Protocol (IP) address of the observed communication, and data representing a remote IP address of the observed communication.

5. The non-transitory computer-readable medium of claim 1, wherein an initial set of negative data is generated, and wherein a subset of the initial negative data is used for the calculating.

6. The non-transitory computer-readable medium of claim 1, wherein the instructions further cause the one or more processors to perform steps of:
   calculating a value of recall for the network communication model; and
   calculating the accuracy of the network communication model based on the recall, or based on a combination of the precision and the recall.

7. A method comprising steps of:
   collecting and storing positive data associated with real observed communications over a network;
   generating a network communication model based on the positive data;
   generating negative data based on the network communication model, the negative data representing traffic that the network communication model should not allow, wherein the negative data is generated by collecting all unique pairs from the observed positive data, and generating a plurality of new unique pairs which do not exist in the network communication model, and wherein a unique pair represents a connection between a source host and application and a destination host and application;
   calculating a precision of the network communication model based on the network communication model and the negative data; and
   calculating an accuracy of the network communication model based on one or more of the precision of the network communication model, or the network communication model and the positive data.

8. The method of claim 7, wherein the negative data is generated to represent negative data that could be observed on the network.

9. The method of claim 7, wherein the negative data is generated based on all of the received positive data, or a portion of the received positive data.

10. The method of claim 7, wherein the network communication model is generated based on positive flow match data representing some or all of observed communications data observed on the network, and wherein observed communications data includes, for each of the plurality of observed communications: data representing a source application of the observed communication, data representing a destination application of the observed communication, data representing a local Internet Protocol (IP) address of the observed communication, and data representing a remote IP address of the observed communication.

11. The method of claim 7, wherein an initial set of negative data is generated, and wherein a subset of the initial negative data is used for the calculating.

12. The method of claim 7, further comprising the steps of:
calculating a value of recall for the network communication model; and
calculating the accuracy of the network communication model based on the recall, or based on a combination of the precision and the recall.

13. A system comprising:
one or more processors; and
memory storing computer-executable instructions that, when executed, cause the one or more processors to:
collect and store positive data associated with real observed communications over a network;
generate a network communication model based on the positive data;
generate negative data based on the network communication model, the negative data representing traffic that the network communication model should not allow, wherein the negative data is generated by collecting all unique pairs from the observed positive data, and generating a plurality of new unique pairs which do not exist in the network communication model, and wherein a unique pair represents a connection between a source host and application and a destination host and application;
calculate a precision of the network communication model based on the network communication model and the negative data; and
calculate an accuracy of the network communication model based on one or more of the precision of the network communication model, or the network communication model and the positive data.

14. The system of claim 13, wherein the negative data is generated to represent negative data that could be observed on the network.

15. The system of claim 13, wherein the negative data is generated based on all of the received positive data, or a portion of the received positive data.

16. The system of claim 13, wherein the network communication model is generated based on positive flow match data representing some or all of observed communications data observed on the network, and wherein observed communications data includes, for each of the plurality of observed communications: data representing a source application of the observed communication, data representing a destination application of the observed communication, data representing a local Internet Protocol (IP) address of the observed communication, and data representing a remote IP address of the observed communication.

17. The system of claim 13, further comprising the steps of:
calculating a value of recall for the network communication model; and
calculating the accuracy of the network communication model based on the recall, or based on a combination of the precision and the recall.

* * * * *